United States Patent
Quick et al.

(10) Patent No.: US 7,656,793 B2
(45) Date of Patent: Feb. 2, 2010

(54) COLLISION DETECTION IN A NON-DOMINANT BIT RADIO NETWORK COMMUNICATION SYSTEM

(75) Inventors: Ashleigh Glen Quick, Bowden (AU); Donald Murray Terrace, Bowden (AU)

(73) Assignee: Clipsal Integrated Systems PTY Ltd, Bowden (AU)

( * ) Notice: Subject to any disclaimer, the term of this patent is extended or adjusted under 35 U.S.C. 154(b) by 598 days.

(21) Appl. No.: 10/567,572

(22) PCT Filed: Aug. 9, 2004

(86) PCT No.: PCT/AU2004/001054
§ 371 (c)(1),
(2), (4) Date: Feb. 8, 2006

(87) PCT Pub. No.: WO2005/015751
PCT Pub. Date: Feb. 17, 2005

(65) Prior Publication Data
US 2006/0192697 A1 Aug. 31, 2006

(30) Foreign Application Priority Data
Aug. 8, 2003 (AU) .............................. 2003904169

(51) Int. Cl.
*G01R 31/08* (2006.01)
(52) U.S. Cl. ........................................ 370/229; 370/231
(58) Field of Classification Search ................. 370/310, 370/310.1, 351, 389, 395.1, 395.5, 395.52; 398/9, 25, 36
See application file for complete search history.

(56) References Cited

U.S. PATENT DOCUMENTS

| 5,040,175 | A | | 8/1991 | Tuch et al. |
| 5,570,355 | A | * | 10/1996 | Dail et al. .................... 370/352 |
| 5,657,326 | A | * | 8/1997 | Burns et al. .................. 370/349 |
| 6,317,854 | B1 | * | 11/2001 | Watanabe .................... 714/749 |
| 6,480,525 | B1 | * | 11/2002 | Parsa et al. .................. 375/141 |
| 6,574,668 | B1 | | 6/2003 | Gubbi et al. |
| 6,804,533 | B1 | * | 10/2004 | Makinen .................. 455/552.1 |
| 6,920,520 | B2 | * | 7/2005 | Chen et al. .................... 710/306 |
| 2001/0033579 | A1 | * | 10/2001 | Nelson et al. ................ 370/447 |
| 2002/0075891 | A1 | * | 6/2002 | Souissi ........................ 370/442 |
| 2002/0101839 | A1 | * | 8/2002 | Farley et al. ................. 370/329 |

(Continued)

FOREIGN PATENT DOCUMENTS

JP 2001-231078 8/2001

(Continued)

OTHER PUBLICATIONS

English Language Abstract of JP 2001-231078.

(Continued)

*Primary Examiner*—Chi H Pham
*Assistant Examiner*—Fan Ng
(74) *Attorney, Agent, or Firm*—Greenblum & Bernstein, P.L.C.

(57) ABSTRACT

A communications system and protocol for use in a non-dominant bit radio network. The radio network includes transceivers which communicate with other transceivers to allow network variables to be shared by all transceivers. The protocol allows the network to handle collisions between competing transmissions from different transceivers. The protocol also handles communications between transceivers that are out of transmitting range of each other.

39 Claims, 5 Drawing Sheets

U.S. PATENT DOCUMENTS

| | | | |
|---|---|---|---|
| 2002/0105961 A1* | 8/2002 | Hottinen et al. | 370/442 |
| 2003/0021228 A1* | 1/2003 | Nakano et al. | 370/229 |
| 2003/0072325 A1* | 4/2003 | Brandli et al. | 370/447 |
| 2003/0161316 A1* | 8/2003 | Kramer et al. | 370/395.4 |
| 2003/0169155 A1* | 9/2003 | Mollenkopf et al. | 340/310.01 |
| 2003/0227934 A1 | 12/2003 | White et al. | |

FOREIGN PATENT DOCUMENTS

| | | |
|---|---|---|
| WO | 01/78426 | 10/2001 |
| WO | 2004/034310 | 4/2004 |

OTHER PUBLICATIONS

U.S. Appl. No. 10/567,575 to Quick et al., filed Feb. 8, 2006.

U.S. Appl. No. 10/567,574 to Quick et al., filed Feb. 8, 2006.

\* cited by examiner

COLLISION DETECTION IN A NON-DOMINANT BIT RADIO NETWORK COMMUNICATION SYSTEM

TECHNICAL FIELD

This invention relates to a network of devices that communicate with each other via radio frequency.

BACKGROUND OF THE INVENTION

A network of devices can be created by arranging a group of devices which communicate with each other via radio frequency (RF) means to transmit data between the devices. Provided that each of the devices is within the range of the maximum communications range of each device, each device can effectively communicate with each other device in the network.

The present invention may be used in a "point to multipoint" system as opposed to a "point to point" system in which communications occur between only two devices at a time. In a point to multipoint communication system, communications occur between one device and two or more of the other devices in the network simultaneously.

A reliable "point to multipoint" communication system allows the creation of a shared network variable. This is a variable which is known to all of the devices in the network. For example, if one device wants to change the value of the shared network variable, it must transmit a request and be guaranteed that all devices receive and process the updated variable simultaneously. If the update cannot be made simultaneously, or not all other devices in the network receive the update, then the network does not have a shared network variable.

Shared network variables allow the creation of a network which has no central controller. All of the essential data about the operation and control of the network is known by each device in the network simultaneously. The data can be updated by any device in the network at any time and all other devices are guaranteed to update their data accordingly. This allows the control of devices within the network to be simplified, more flexible, and less costly when compared with networks having a central controller.

A single communication action between each of the devices is herein referred to as a Transaction. A Transaction occurs between a device (transceiver/transmitter) which transmits data to one or more transceiver/receivers of the data. The Transaction also includes data sent from the transceiver/receivers to the transceiver/transmitter as well as to each other of the transceiver/receiver devices in the network.

In this context, a device which for a given Transaction, transmits the data to be shared throughout the network is referred to as a "transceiver/transmitter" while a device which receives that data within the Transaction, is returned to as a transceiver/receiver. It will be understood that within the same Transaction, a given transceiver/receiver may also transmit an acknowledge signal. In the next Transaction, the transceiver/receiver may become the transceiver/transmitter.

When transmitting to more than one transceiver/receiver simultaneously (also known as a broadcast or multicast), it is important to know that all transceiver/receivers have successfully received the data. If even one transceiver/receiver has not successfully received the data (for example because of a bit error causing data corruption in one transceiver/receiver), then all other transceiver/receivers must be informed that not all of the other transceiver/receivers have successfully received the data.

Such networks usually use a method of coding the data bits to be transmitted. The coding method is chosen as a compromise between the transmission technology available and performance requirements such as data rate and sensitivity. Commonly used coding types include Manchester Coding and bit stuffing.

In conventional point to point communication protocols, a general procedure is to have each device transmit an acknowledge statement some time after receipt of the data. This has the drawback that the transmitting device must know exactly the number of receiving devices within the network, and how to contact each of them. The reliable transfer of the same piece of data to multiple receiving devices requires many transmissions of the same data, and a corresponding wait for each transmission to be acknowledged. The repetitive transmission of the same data to many recipients wastes the available bandwidth of the communication medium. This approach also requires the transmitter to obtain and store data about exactly which receiving devices are to accept a given transmission. This approach allows the creation of a shared network variable, at the expense of unnecessary complexity and poor use of the available bandwidth of the communication medium.

Alternatively a point to multipoint transmission can be used to transfer data to many recipients simultaneously, without any acknowledgment being returned. This renders the data transfer unreliable, and the transmitter will not be able to determine whether all of the receiving devices have successfully received the data. Unreliable transfer of data means that a shared network variable cannot be created.

The situation is compounded when two or more devices are out of communications range of each other. As it will be appreciated, each device has a maximum transmitting range (determined by design factors, including but not limited to transmit power, receiver sensitivity, antenna type, and signal processing algorithms). Communications, and synchronising communications is made more complicated when some devices are outside the maximum range and therefore cannot communicate with each other.

The creation of a shared network variable is also impeded by the occurrence of collisions between transmissions from various devices. Collisions adversely affect the successful transmission of data throughout the network. It is important to be able to detect the occurrence of a collision, and deal with it appropriately. Such appropriate action may include informing the transmitting device that its transmission was interrupted, as well as informing other devices in the network that a collision has occurred.

Traditional methods of reducing the likelihood of collisions include monitoring the medium for a period of time before transmitting. Each device is then delayed in its transmission by either a random period, or a period of time that is unique for each device in the network. For example, this period of time can be made unique for each device by using the devices' unit address (which has to be unique for the device to be uniquely addressable). This can be scaled by the duration of a single bit, so that if several devices wish to start transmitting at exactly the same time, they will then wait for different periods. Whichever waits the shortest time can start transmitting (and the other devices will see this transmission, receive it, and retry their own transmission at a later time).

This approach significantly reduces the likelihood of collisions however, is not fail safe and is not necessarily appropriate when multiple networks are used in which devices in different networks may use the same address.

It is an object of the present invention to provide a system and protocol for improving the communications between devices in an RF multicast communications system, particularly in the event of a collision occurring between two or more data transmissions.

SUMMARY OF THE INVENTION

According to a first aspect of the present invention, there is provided a data frame for use in a radio frequency communications network, the data frame including data that is coded so as to be perceived by a device receiving the data frame, as a collision when the device is already receiving data from another source.

According to a second aspect of the present invention, there is provided a method of detecting a collision between two transmissions in a radio frequency network of devices, the method including;

transmitting from a first device, a first data frame according to the first aspect of the present invention;

transmitting from a second device, a second data frame according to the data frame of the first aspect of the present invention; and detecting a coded data sequence from the second data frame while receiving the first data frame, and recognising the resulting data sequence as indicating a collision.

According to a third aspect of the present invention, there is provided a radio communication system including at least three devices, in use, the first device transmits a first data frame according to a first aspect of the present invention, a second device transmits a second data frame according to a first aspect of the present invention; and a third device receives the first and second data frames and detects the coded data from the second data frame while receiving the first data frame, and recognises the resulting data sequence as indicating a collision.

According to a fourth aspect of the present invention, there is provided a transceiver for use in a radio communication system including at least two other transceivers, in use, a first of the other transceivers transmits a first data frame according to a first aspect of the present invention, and the second other transceiver subsequently transmits a second data frame according to a first aspect of the present invention, the transceiver, in use, upon receiving the coded data from the second data frame while receiving the first data frame, recognises the resulting data sequence as indicating a collision.

According to a fifth aspect of the present invention, there is provided a communications protocol for use in a radio frequency network of devices, the protocol having a frame including;

a first time slot for transmitting data;

a second time slot, after the first time slot, for transmitting a first acknowledgement state;

a third time slot, after the second time slot, for transmitting a second acknowledgement state; and a fourth time slot, after the third time slot, for transmitting a collision indication.

According to a sixth aspect of the present invention, there is provided a radio communication system including a transceiver/transmitter, and at least two transceiver/receivers, wherein the transceiver/transmitter transmits data in a first time slot to the transceiver/receivers, and wherein upon receipt of the data, each of the transceiver/receivers return either a first acknowledgement state in a second time slot, after the first time slot, a second acknowledgement state in a third time slot, after the second time slot, or a collision acknowledgement in a fourth time slot.

According to a seventh aspect of the present invention, there is provided a transceiver/receiver for use in a radio communications system including at least one transceiver/transmitter and at least one other transceiver/receiver, in use, the transceiver/receiver upon receiving a data packet in a first time slot from said transceiver/transmitter, either transmits a first acknowledgement state in a second time slot, after the first time slot, transmits a second acknowledgement state in a third time slot, after the second time slot, or transmits a collision acknowledgement state in a fourth time slot, after the third time slot.

According to an eighth aspect of the present invention, there is provided a transceiver/transmitter for use in a communications system including at least one other transceiver/receiver, wherein in use, the transceiver/transmitter transmits a data packet in a first time slot to the at least one transceiver/receiver and receives either a first acknowledge state in a second time slot, after the first time slot from one or more of the transceivers/receivers, receives a second acknowledgement state in a third time slot after the second time slot from one or more of the transceiver/receivers, or receives a collision acknowledgement state in a fourth time slot after the third time slot, from one or more of the transceiver/receivers.

According to a ninth aspect of the present invention, there is provided a communications protocol for use in a radio frequency network of devices, the protocol having a frame including a first time slot for transmitting data, a second time slot, after the first time slot, for indicating a repeat flag, and a third time slot, after the second time slot, for retransmitting the data transmitted in the first time slot and a fourth time slot, after the third time slot, for allowing acknowledgement of a collision between two or more transmissions.

According to a tenth aspect of the present invention, there is provided a radio communication system including a first transceiver, a second transceiver and a repeater, the first and second transceivers being separated from each other by a distance greater than at least one of their respective maximum transmission ranges, and the repeater being located intermediate the first and second transceivers, wherein upon receiving data from one of either the first or second transceivers, in a first time slot, the repeater transmits a repeater flag in a second time slot, and then in a third time slot transmits the data received in the first time slot.

According to an eleventh aspect of the present invention, there is provided a repeater for use in a radio communication system including at least two transceivers, the at least two transceivers being separated from each other by a distance greater than at least one of the respective transmitting ranges, in use, the repeater being disposed intermediate the at least two transceivers wherein upon receiving data in a first time slot, the repeater transmits a repeat flag in a second time slot, transmits in a third time slot, the data received in the first time slot, and then transmits, in a fourth time slot, a collision acknowledge, if a collision has occurred between two or more transmissions.

According to a twelfth aspect of the present invention, there is provided a transceiver for use in a radio communication system including at least one other transceiver and a repeater, the transceiver and the at least one other transceiver being separated from each other by a distance greater than at least one of their respective transmitting ranges, in use, the repeater being disposed intermediate the transceiver and the at least one other transceiver, wherein upon receiving a repeat flag from the repeater, in the second time slot, the transceiver suspends further action until the transceiver receives from the repeater, in a third time slot, data that was originally transmitted by the at least one other transceiver in a first time slot, before the second time slot.

According to a thirteenth aspect of the present invention, there is provided a radio communication system including at least a first transceiver, the second transceiver and a repeater, the first transceiver and the second transceiver being separated by a distance greater than a maximum transmission range of at least one of the transceivers, the repeater being disposed intermediate the first and second transceivers, such that upon receipt of a data transmission from the first transceiver, the repeater re-transmits the data transmission from the first transceiver, wherein, upon receipt of a data transmission from the second transceiver before the repeater retransmits the data transmission from the first transceiver, the repeater transmits a data sequence instructing each transceiver to ignore the transmission in progress.

The system and protocol of the present invention have many uses including applications in controlling domestic, industrial and office appliances.

DETAILED DESCRIPTION OF THE PREFERRED EMBODIMENT

According to an aspect of the present invention, any collisions that occur, will be detected through the use of coding of data frames transmitted by devices within the network.

There are two types of collisions that can occur. The first is between two devices, which are in range of each other, that for some reason started transmitting data at the same time. In spite of various avoidance method techniques traditionally used, such as monitoring the medium before transmission and staggering the subsequent transmission of data by devices in accordance with each devices' unit address, a collision may still occur. In this case, the data transmissions will overlap each other in time.

The other type of collision, and one that is more likely to occur, is in the case where a device needs to transmit data to other devices distributed over several separate networks. Across two of these networks for example, some devices will be close to each other (even though in different logical networks) while other devices, may be out of range of each other if they are physically located at opposite ends of their respective networks.

This arrangement will have a higher probability of collisions occurring because multiple devices share the same address (even though on different networks) and can therefore begin their respective transmissions simultaneously. Furthermore, because some devices will be out of range of each other, it will be more difficult to detect that collisions have occurred because the data transmissions from the respective devices will not overlap directly. In these cases however, devices situated between the two extreme devices, and which are within range of both devices, will detect the collisions during reception and this fact can be taken advantage of to deal with the collisions.

Going back to the first case, the present invention addresses the problem of a collision between the transmissions of two devices within range of each other in the following manner.

According to an aspect of the invention, each data frame transmitted by a device includes a specially coded portion, preferably at or near its beginning, which when received by a device that is already receiving another transmission, will be perceived as a collision.

Figure 1:
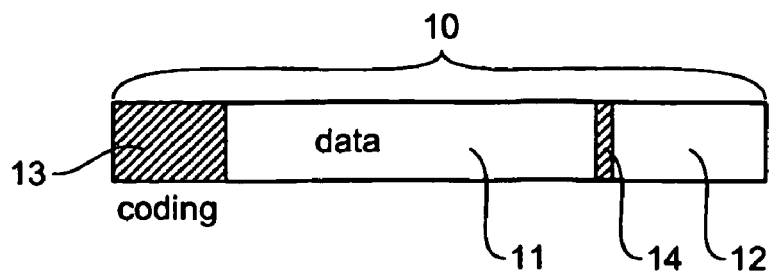
FIG. 1 shows a data frame structure according to the present invention.

FIG. 1 shows an exemplary structure of a frame 10 including a data portion 11, an acknowledge portion 12 and a coded portion 13. Exemplary frame 10 also includes an "end of data" marker 14.

Figure 2A:
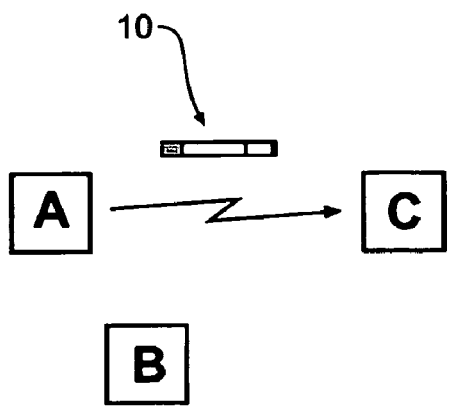
FIG. 2A shows an illustrative example of three devices in a network with a first device transmitting a data packet of FIG. 1.
Figure 2B:
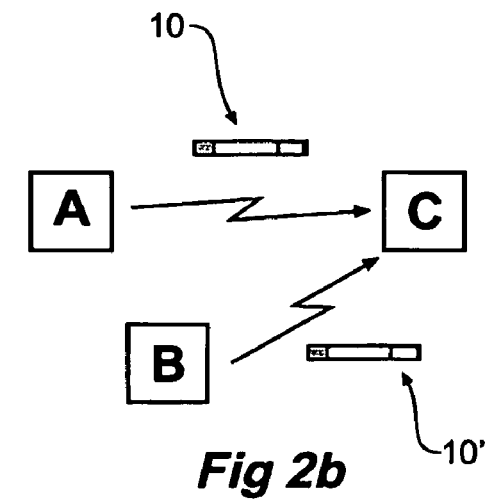
FIG. 2B shows an illustrative example with a second device transmitting a data packet of FIG. 1, and causing a collision.
Figure 2C:
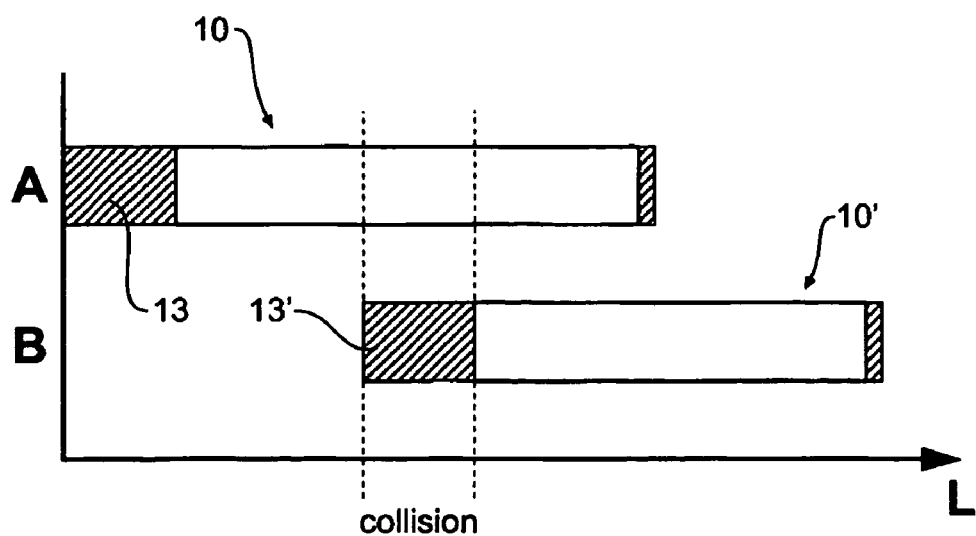
FIG. 2C is a timing diagram of the data packets transmitted in FIGS. 2A and 2B.

The frame structure can be used in an exemplary network as shown in FIG. 2A, 2B. In this example, as shown in FIG. 2A, device A will transmit data frame 10 including coded portion 13 and data portion 11 to be received by device C. In this situation, device C is not already receiving another transmission and upon receipt of first data frame 10 from device A, will ignore coded portion 13 and proceed to process the data 11 in data frame 10. If, for some reason, during the transmission of data frame 10, device B begins to transmit a respective data frame 10' to device C, as shown in FIG. 2B, device C will suddenly detect coding portion 13' from data frame 10' and since it is already receiving data frame 10, it will perceive coding portion 13' as a collision. A timing diagram illustrating this situation is shown in FIG. 2C.

Upon detection of the collision, device C will continue to receive the collided data frames until it can detect the end of data marker 14' of the second transmission. At this point, device C will send a collision acknowledge indication to device B which informs it that data transmission was corrupted and it should resend the data packet. Device A, not having received any acknowledge signal from device C when its transmission was completed (because device C was still continuing to receive the data transmission from device B), will treat this as a dropped packet and will know that it will need to resend its transmission.

The example described above assumes that the transmission of device B was completed after the transmission of device A however, in the case where data frame 10 of device A's transmission is much longer than that of device B's, then device C will detect the end of data marker from device A's transmission and device A will receive a collision acknowledge signal. Device B in this case will not receive any acknowledgement signal and will assume that its data packet was dropped and will try to resend its data later.

In the unlikely event that both devices A and B begin transmitting effectively simultaneously (within about ¼ of a symbol or less), one of three outcomes will occur.

A The data being transmitted in the two transmissions will collide, and device C will eventually detect a collision anyway. This is because there are generally enough differences in the two data streams being transmitted by the two devices which will be perceived by device C as a collision. This is however dependent on the requirement that enough data differences exist which cannot always be guaranteed.

B The data from the two packets will collide, but device C does not detect a collision (for example, because there are not enough data differences between the two transmissions for a conclusive determination of a collision), however, the collision may result in sufficient corruption of the data stream so that the device C will respond with a negative acknowledge, when the last of the two data transmissions is completed.

If devices A and B were both sending data streams of exactly the same length, then both devices A and B will receive the negative acknowledge back from device C and will retry their respective transmissions later. If however the length of the packets of devices A and B were different, then the device sending the shorter transmission will be waiting for an acknowledge signal from device C while the other device is still transmitting. As the first device does not get any acknowledge signal, it will assume that it has a dropped packet and will attempt to retransmit its data at a later time. The device sending the longer transmission will eventually receive either a negative acknowledge (if device C could detect the data corruption, and detect the end of data marker), or if the end of data marker was not detected by device C, device C will not acknowledge at all and the transmitting device will thus assume that its packet was dropped and will retry its transmission later.

C If the two transmitters both send exactly the same data at exactly the same time (which is highly unlikely in practice), then both transmissions will be detected by device C as a single transmission and will respond to device A and B with a positive acknowledgment and each device will then assume that its data has been successfully transmitted and received, which it has.

An exemplary coding system which may be used in the detection of collisions is as follows:

a ZERO bit will be coded as an OFF, ON pair, and
a ONE bit will be coded as an ON, OFF pair.

Accordingly, a collision between the ZERO and ONE data bits will be detected as ON, ON. For example a collision of a single bit followed by normal data bits; ON, ON, ON, OFF would indicate a single bit collision followed by a ONE bit. A collision of multiple consecutive bits followed by normal data bits, ON, ON, ON, ON, OFF, ON would indicate two colliding bits followed by a ZERO bit.

It will be appreciated that detectable collisions always lead to reception of the ON, ON pair. This is a violation of the Manchester Coding system which can only encode the ZERO and ONE bits as described above.

As will be understood, the frames will begin with a START code and an END code, being frame markers. These are also done using Manchester Coding violations. In this case, advantage is taken of the following facts:

A coding violation (ON, ON) followed by a data bit (ON, OFF or OFF, ON) indicates a collision;

A coding violation (ON, ON) followed by more collisions (more ON, ON) is still a collision.

However, in the instance of a coding violation (ON, ON) followed by another special violation (OFF, OFF), this cannot ever occur due to a collision, or due to a collision followed by valid data bits. In this case, the sequence ON, ON, OFF, OFF is used as a lead-in. If this is detected, the receiver recognises this as a marker indicating a special tag embedded in the stream being transmitted. If the sequence is followed by the pair OFF, ON it indicates START OF FRAME. If the sequence is followed by ON, OFF, it indicates END OF FRAME.

The sequences:

ON, ON, OFF, OFF, OFF, OFF and ON, ON, OFF, OFF, ON, ON are illegal.

According to another feature of the present invention, which is particularly useful to update the other devices in a network or distributed networks, is the feature of the receiving device (C) transmitting a signal upon detecting the initial collision between the two data frames transmitted by devices A and B. This signal will be perceived by other devices within the range of device C as a collision and these devices will in turn, transmit the same signal to devices within their respective ranges. In this manner, all of the devices within a network or distributed networks will be informed that a collision somewhere in the network has occurred, even those devices which may be physically located well out of range of the device at which the collision first occurred.

In practice, device C, upon detecting the initial collision between the transmissions of devices A and B, will stop receiving for a short period of time, transmit the long burst that forces a collision to be detected in other devices, and then resumes its receiving function. When device C detects the collision, the detectability of data after the collision is interrupted, so from the point of collision detection onwards, the other thing that device C tries to detect is the end of frame marker. It will be understood that the end of frame marker may not always be recognisable in every circumstance however, device C will attempt to locate this marker.

There is the slight possibility that during the period of transmission by device C of the long burst collision signal, the end of data marker will be transmitted by device A or B (which ever transmission ends last) and will be missed by device C. In this case, the transmission will not be acknowledged and will be regarded as a dropped packet by the devices transmitting the packets and each device will attempt to retransmit the data at a later stage.

Figure 3:
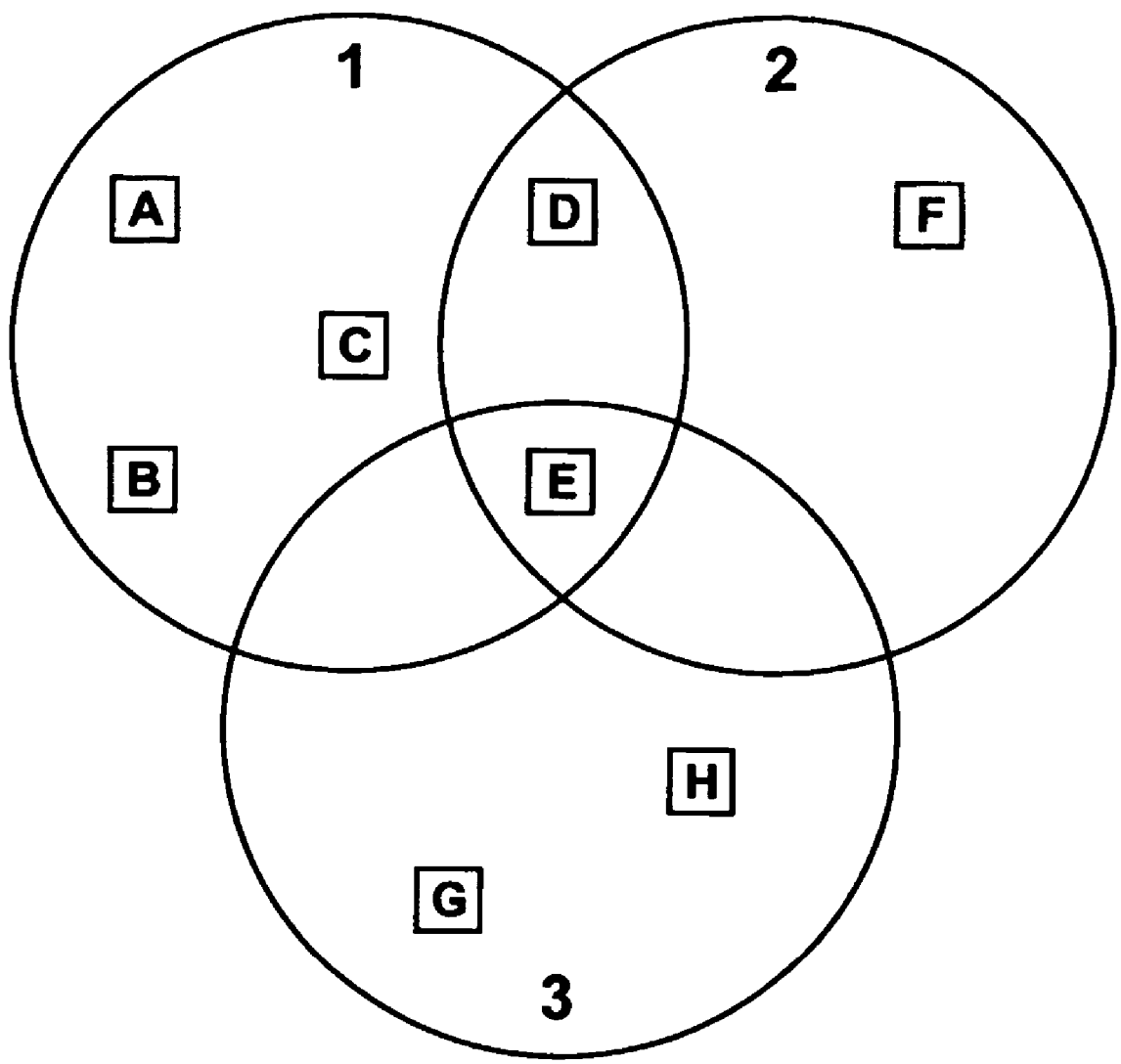
FIG. 3 shows network devices A-H distributed among these networks, 1-3.

FIG. 3 shows an exemplary illustration of three networks which, while separate, most work in close proximity to each other. Network 1 consists of devices A, B, C and D while Network 2 consists of devices E and F. Network 3 consists of devices G and H. As described above, if a collision occurs at device C from transmission initiated by devices A and B, device C will transmit a collision signal which would be received by devices D and E because D and E would be within the range of device C however, device F in Network 2 and G and H in Network 3 will not receive this signal because they are out of range of device C. According to the invention, as the collision signal from device C is received by device D, device D will in turn transmit a similar collision signal upon receiving the collision signal from device C which will be detected by devices F and E. Similarly, device E will also detect the collision signal from device C as device E is within range of device C and will transmit its own collision signal which will also be received by devices G and H. In this way, the collision signal is propagated throughout the network until all devices within the network/networks have been informed of the occurrence of the initial collision at device C in Network 1.

The principles of the invention will now be described in the context of a particular network structure which is the subject of two copending applications.

Figure 4:
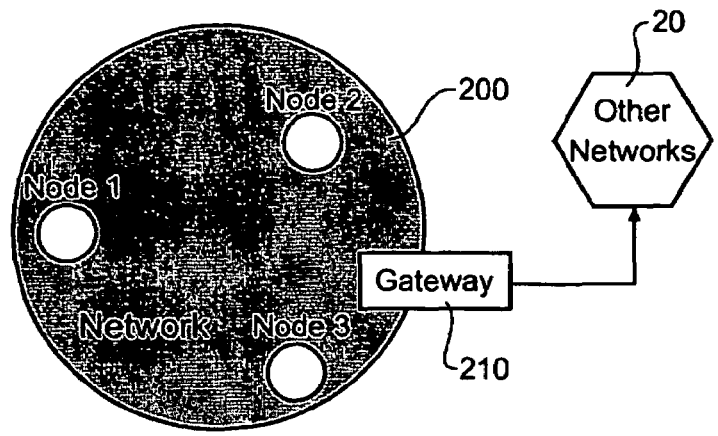
FIG. 4 shows one network architecture according to a preferred embodiment of the present invention.

An exemplary architecture of a network is shown in FIG. 4, in which the network 200 is made up from nodes 1, 2 and 3. Nodes 1, 2 and 3 are transceiving devices and may act as transmitters and/or receivers in a given communication Transaction. The network 200 may communicate with other networks 20, via gateway 210.

The protocol design of the present invention is based on the ISO 7 layer model and some terminology is common with that used by ISO. The protocol used in the present invention is connectionless, meaning that once a single data transfer has taken place, there is no expectation of additional related data transfers either before or after.

Figure 5:
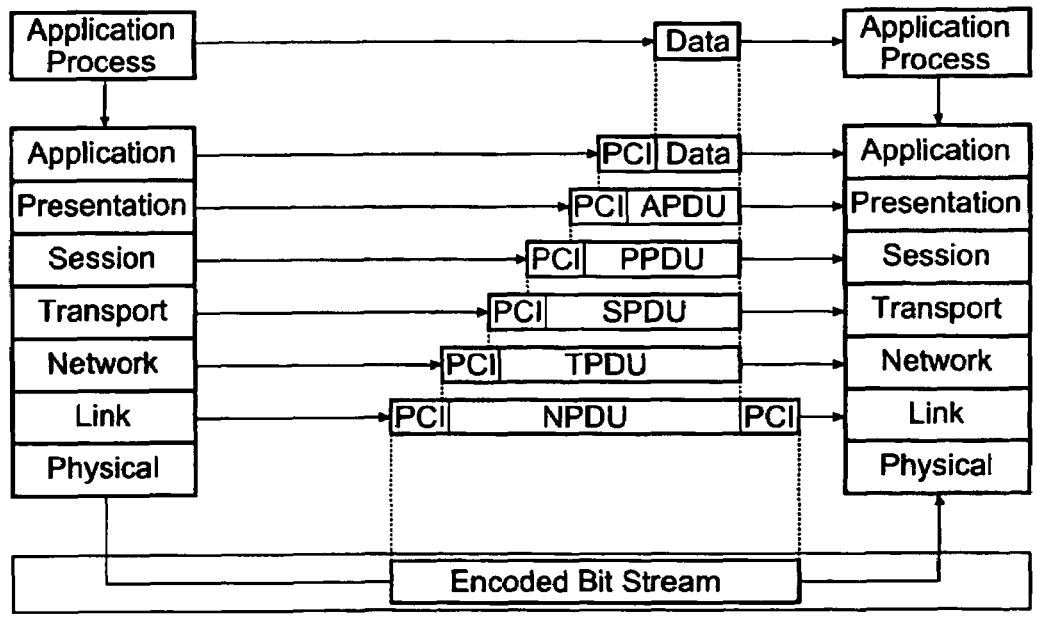
FIG. 5 shows the network protocol model used in the environment of the present invention.

The protocol model of the present invention is based on the ISO 7 layer model and is shown in FIG. 5. For applications distributed over two nodes, each protocol layer has a virtual connection to the equivalent layer in the other node. As can be seen, each layer takes data provided by the layer above, treats it as a data unit and adds its own protocol control information (PCI) field. At each layer, the protocol data unit (PDU) is either the data, or a package provided by the next higher layer. The name of the PDU is prefixed by the layer to which it applies (For example, SPDU is a session PDU).

The physical layer relates to the mechanical and electrical network interface in the ISO system. In the system of the present invention, the physical layer refers to the hardware and firmware elements used to transmit and receive bits over the communication medium.

In the ISO system, the link layer is used for data link control (for example, framing, data transparency, error control). In the present invention, the link layer is used to break bytes up into bits, bit stuffing (if required), framing, collision detection, prioritisation, error detection, positive/negative acknowledge generation, checking, repeating and retransmission.

The network layer in the ISO system is used for networking routing, addressing, call set-up and clearing while in the present invention, the network layer is used for network routing, addressing, Transaction set-up and clear.

In the ISO system, the transport layer is used for end to end message transfer, connection management, error control, fragmentation and flow control. The transport layer is not used in the environment of the present invention.

The session layer in the ISO system is used for dialogue and synchronisation control for application entities but is not used in the environment of the present invention.

The presentation layer is used for transfer syntax negotiation, and data representation transformations in the ISO system while in the environment of the present invention, the presentation layer is used for optional encryption of application data.

The application layer in the ISO system is used for file transfer, access management, document and message interchange, job transfer and manipulation while in the environment of the present invention, the application layer supports sending and receiving application data.

Finally, the user application layer is used both in the ISO and the environment of the present invention for whatever is needed to achieve a specified function or behaviour.

It is predominantly in the link layer that the features of the present invention reside.

In the protocol of the present invention, use can optionally be made of a dominant bit, and an inferior bit. If two devices simultaneously transmit a dominant and an inferior bit, then receivers and transmitters (monitoring their own transmissions) will detect only the dominant bit. This process is described in a copending patent application. In general however, the protocol will not use dominant and inferior bits, and collisions must be dealt with by the method of the invention as previously described.

Media access is obtained by a transmitter first monitoring the media for a period that is distinct for each device in a network, and if no existing transmission is detected, the transmitter will try to claim media access by transmitting a preamble stream. This preamble starts with at least one detectable bit. The claim for media access defines the start of a Transaction. A Transaction consists of all data transfer, acknowledgement and repeating of data. All nodes in a network must monitor the media continually and if they detect a Transaction occurring they will defer any attempt to claim media access until the completion of the current Transaction.

Transactions are asynchronous: they can occur at any time and the time difference from the start of one Transaction to the next does not have to be an integral number of bit periods.

Figure 6:
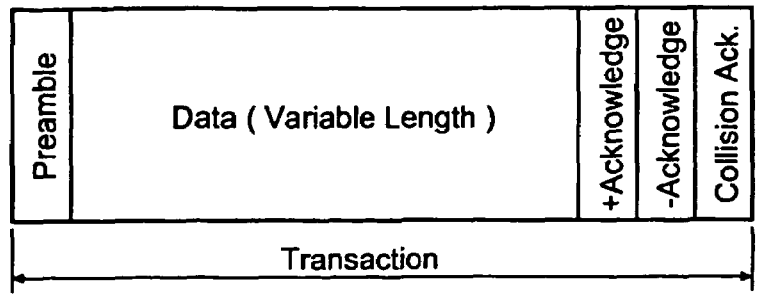
FIG. 6 shows a frame structure according to a preferred embodiment of the present invention.

In this application, a Transaction is specifically defined as a continuous period of time broken up into several sub-time slots containing different types of data. A Transaction will begin with a preamble for a set period of time, followed by the specific data which is to be transmitted from a transceiver/transmitter to two or more transceiver/receivers. The timeslot during which the data is transmitted is variable in length, and includes a portion used as a frame check sequence. Following the data transmission are two timeslots during which positive and negative acknowledgements are transmitted by the transceiver/receivers, followed by a timeslot during which collision indication is transmitted by the transceiver/receivers, as described above. The structure of this frame is shown in FIG. 6.

As described above, a Transaction is asynchronous and can start at any time. However, once started, the Transaction has a time-based structure. Special markers in the Transaction are used to show the beginning and end of the variable length data portion. The time slots during which positive and negative acknowledgement, and the collision indication are transmitted, are fixed in time. By careful coding and redundancy of data encoded into these timeslots, a positive acknowledgement by one or more transceiver/receivers and a negative acknowledgement by one or more transceiver/receivers can be conveyed. All of the devices involved in the Transaction see both of the acknowledgment timeslots.

Transceiver/receivers wishing to positively acknowledge, will transmit a special code during the positive acknowledge timeslot and will receive during the negative acknowledge timeslot.

Similarly, transceiver/receivers wishing to negatively acknowledge will receive during the positive acknowledge timeslot and transmit a special code during the negative acknowledge timeslot.

The fact that the devices monitor the timeslots they are not transmitting, ensures that by the end of two acknowledge timeslots each device has detected either positive acknowledges, negative acknowledges or both and can therefore work out the overall acknowledge state of the network.

For example, the transceiver/receiver which transmits a positive acknowledge will be able to detect some other transceiver/receiver which transmits a negative acknowledge.

At the end of the Transaction, all devices do not know how many positive or negative acknowledges there were, all they have to know is that there were some positive and some negative.

If there were any negative acknowledges at all during the Transaction, then all of the transceiver/receivers know this, and can discard the data received. Similarly, the transceiver/transmitter knows this and can attempt to re-run the Transaction.

The generation of a positive acknowledge will be as follows. Upon receiving data, a node will generate a positive acknowledge only when:
- the data timeslot has been checked against its embedded frame check sequence and found to be valid; and
- any addressing information present in the data timeslot matches an addressing information used by the device; and
- no collisions were detected.

Each device transceiver generally contains at least two different types of address, as follows:
- A Unit Address, allowing the device to be uniquely addressed in isolation; and
- A Multicast address, allowing those devices in a network to be addressed simultaneously for the purpose of updating shared network variables.

In addition, devices can also optionally contain:
- A Network Address, allowing physical devices to be grouped by the logical network to which they are allocated.

Other variations are possible, but these three address types are fundamental, and used as the basis for other more sophisticated addressing schemes.

The processes involved in generation of a negative acknowledge are as follows. A receiving device (transceiver/receiver) will generate a negative acknowledge only if the data timeslot is determined to be corrupted, by checking the received data using the embedded frame check sequence.

Where a device determines data timeslot corruption, there is no point further examining any fields inside the data timeslot.

Acceptance of the data transmitted by the transceiver/transmitter is only made by the transceiver/receivers if the condition for generation of a positive acknowledge are met and if no other transceiver/receiver has generated a negative acknowledge. This ensures that all transceiver/receivers receive a given message only once. For point-multipoint messages, this may mean that a message is discarded by a transceiver/receiver, even if it appears valid and was positively acknowledged.

The above describes the general environment in which the present invention can be utilised. The sequences described above can only be used when each device is within range of the other. It will be understood that each device will have a maximum transmitting range, beyond which it cannot communicate with other devices. The maximum transmitting range is determined by design factors, including but not limited to transmit power, receiver sensitivity, antenna type, and signal processing algorithms. For short range (unlicensed) devices, the range is typically from tens to, at most, several hundred meters. A typical maximum transmitting range for such a device is in the order of 20 meters. In the case where one or more devices are located beyond the maximum transmitting range of another device (i.e. cannot communicate with that device directly), difficulties in implementing the above-described procedure will be encountered. Particularly, in the case where a transceiver/transmitter transmits data, some or all of the other transceivers/receivers will not receive the data from that particular transceiver/transmitter and accordingly, will make it impossible to update shared network variables.

In accordance with the present invention, the protocol described above is modified to allow the retransmission of data between devices so as to extend the effective transmission range of the devices used in the network. The modified protocol is used in conjunction with a repeater which is placed roughly in the geometric center of devices in the network and acts as a relay between devices distributed beyond their normal transmission range.

Figure 7:
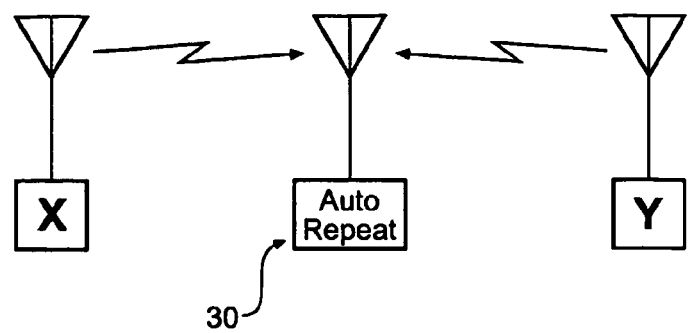
FIG. 7 shows a repeater and two transceivers disposed in a network according to the present invention.

FIG. 7 shows an example configuration of devices X and Y in a network. Devices X and Y are separated by a distance greater than each of their respective transmitting ranges. Thus, if device X were to transmit data as described above, device Y would not receive this data and would not know how to proceed as described above. In accordance with the present invention however, repeat device 30 is placed between devices X and Y, and acts as a repeater. Thus, if device X transmits data, repeat device 30 will receive this transmission from device X and retransmit the data such that device Y will receive device X's data. When device Y transmits its acknowledgment, this will be received by the repeater. The repeater in turn transmits an overall acknowledge status which will be received by both devices X and Y. Both devices then know that the information was relayed by the repeater, and in turn accepted or rejected by all devices in range of the repeater. Devices X and Y can then proceed in the normal manner.

Of course, device Y for example need not be a transceiver/receiver but may be a transceiver/transmitter. In this case, device Y will transmit information to the network however, because device X (for example a transceiver/receiver) being out of range of device Y would not receive the transmitted data. Again, repeat device 30, being disposed between device X and device Y, will receive the data transmitted by device Y, and retransmit this data so that device X and any other devices within the range of repeat device 30 will receive the retransmission.

It will be appreciated that in practice, repeat device 30 does not need to be placed directly between two devices but may be placed in any suitable position such that devices within the network can be reached.

In some cases, it may be possible that device X will have sufficient range to reach device Y however, device Y, having a shorter transmission range than device X, will not be able to communicate with device X. In this case, repeat device 30 may be positioned closer to device Y than to device X in order to allow transmissions from device Y to reach repeat device 30 which can then be repeated and communicated to device X.

Practically, it is beneficial to construct all devices in the network in the same way. This means that each device, whether it acts as a transceiver/transmitter, transceiver/receiver or repeat device, will be constructed in the same way and can be separately enabled to perform their desired functions. This provides significant savings in the complexity and cost of manufacture since only one device need be manufactured.

In use, if a device is acting as a repeater, upon receiving information in the first frame (see FIG. 6), the repeater will immediately transmit a repeat flag in a new second time slot and then retransmit, in a new third time slot, the data received in the first time slot. The network then operates normally as described above in that devices being transceivers/receivers that have received the retransmitted information will then proceed to acknowledge the successful or unsuccessful receipt of that data as discussed above, and the repeater will issue a final overall repeat status to inform all devices in the network of the success or failure of the repeated data.

Figure 8:
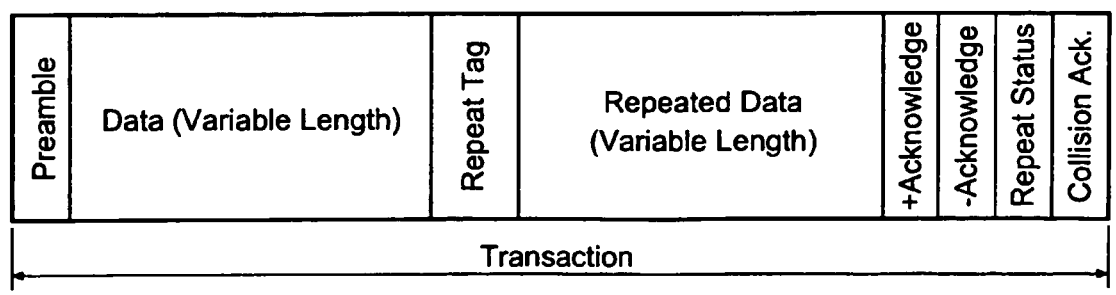
FIG. 8 shows a frame structure used in the configuration of FIG. 7.

The modified protocol frame is shown in FIG. 8. A comparison with the frame of FIG. 6 clearly shows the differences between the modified repeat tag transaction of FIG. 8 and the non-repeat tag transaction of FIG. 6. Specifically, the first time slot providing for transmission of data is present in both transaction frames however, in the repeat tag frame of FIG. 8, a second time slot is provided for the transmission of a repeat tag flag. A third time slot is provided in which the data transmitted in the first time slot is then retransmitted. The frame structure then continues in the same way as the frame structure of FIG. 6. Specifically, an acknowledgment time slot is provided to contain a first sub-time slot for transmitting a positive acknowledge, a second sub-time slot for transmitting a negative acknowledge and a third sub-time slot used for transmitting a collision indication. Furthermore, in the repeat tag frame of FIG. 8, an additional time slot is provided for the transmission of a repeat status which provides confirmation to all devices that the transmission has been repeated.

The situation described above in relation to the repeater is complicated even further by the fact that it is possible that some devices can begin the transmission at the same time. When all devices are within range of each other, collisions are normally avoided by having each device monitor the medium for a unique period before attempting transmission. When the devices, for some reason, have the same delay period (for example by being in distinct networks but located within range of each other) a collision can still occur. In that case it is possible for some devices in a network to detect a collision, but others could have sufficient range that they do not detect the collision. Those devices that detect a collision can notify the presence of the collision in their acknowledge time slot. However, this method could become unreliable in some circumstances. To improve the reliability of detection and notification of the collision, it is propagated by all devices that detect it. This spreads the collision through the devices in the network ensuring that the knowledge of the collision is rapidly distributed.

In the case where a repeat device is used, there is some delay between a device transmitting and another device receiving that transmission. During this delay period, it is possible for transmission to begin from another device, out of range of the original transmitting device. The repeater in this case simply transmits the collision propagation described above, and if possible transmits the collision indication as part of a subsequent acknowledge timeslot. Once the repeater has started transmission, it cannot detect a collision but other devices within range can do so and notify the repeater using the collision indication portion of the acknowledge time slot.

For example, with reference to FIG. 7, if device X begins transmitting, there will be a delay between the time repeat device 30 receives device X's transmission and the time it retransmits the transmission to be received by device Y. During this time, device Y may begin transmitting its own data which will cause a collision with the transmission of device X before repeat device 30 has begun to retransmit that transmission. Repeat device 30 detects and propagates this collision.

In summary, the above describes detection of a collision by any device, and deliberate transmission of a sequence that looks like a collision to other devices. This causes the collision that was detected to propagate through the network. The receiving devices, having propagated the collision wait until the transmission finishes. If they can, they indicate a collision back to the transmitting device using the collision indicate field of the acknowledgment ($4^{th}$) time slot. In this way, the transmitting devices know that a collision has occurred and can re-transmit appropriately. If they cannot indicate the collision back to the transmitting device, the receiving devices do not send any acknowledgment at all. In any event, the receiving devices are aware of the collision (either because they detected the original collision, or they detected the propagated collision). Similarly, the transmitting devices know the transmission was unsuccessful because they either get a specific indication as such, or get no acknowledgment at all. This approach extends through the repeater.

A further refinement of this includes the monitoring of the medium when any transmission starts for a period of time that varies from one device to another. This helps to reduce the probability of a collision occurring. The amount of time to delay is generally an integer multiple of the time a single bit takes to transmit. This is a collision avoidance period. By making the period unique for each device in a network, collisions would in theory never occur. This is accomplished most expediently by using the unique address of a device, scaled by, for example, the duration of a bit, as the time to wait when monitoring the medium. Optionally, the delay can be increased with each successive collision detected. If too many successive collisions are detected (for example, above a preset threshold number), the transmission attempt can be cancelled and an operator notified.

Accordingly, the only time a collision can occur (theoretically) is when two devices use the same delay period. This can happen if several distinct networks are within range of each other (known as the "adjacent apartment" problem discussed previously), and is addressed using the collision propagation method of the present invention.

As previously discussed, practically, it is beneficial to construct all devices in the network in the same way. This means that each device, whether it acts as a transceiver/transmitter, transceiver/receiver or repeat device, will be constructed in the same way and can be separately enabled to perform their desired functions. This provides significant savings in the complexity and cost of manufacture since only one type of device need be manufactured.

Figure 9:
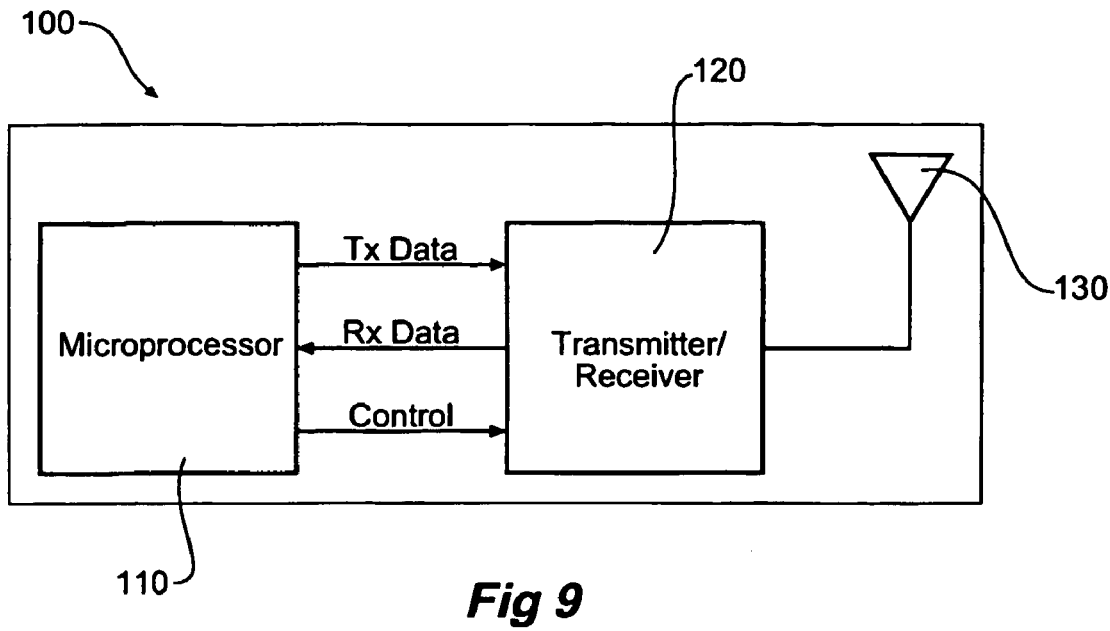
FIG. 9 shows a preferred structure of a transceiver device used in the present invention.

The preferred implementation of the transceiver device 100 uses a radio receiver, a radio transmitter, and a microprocessor. These first two items can optionally be combined as a transmitter/receiver, as shown in FIG. 9 which shows device 100 including microprocessor 110 and transmitter/receiver 120. Transmitter/receiver 120 transmits and receives data via antenna 130.

It will be appreciated that use of a microprocessor is not mandatory. For example the protocol could be implemented in a dedicated integrated circuit, a programmable logic device or a programmable gate array. Using a microprocessor is convenient because it allows a readily modifiable software implementation, and reduces the overall parts count. However the software implementation is only suitable for low to moderate data rates.

The function of the transmitter/receiver 120 is to receive or transmit information. The choice of transmitter/receiver will be determined by a range of factors, including (but not limited to):

a. The regulatory environment of the market into which the product will be sold.
   Each country has regulations that determine factors including allowable frequencies, transmit power levels and bandwidth.
   Transmitter/receivers suitable for use in some countries may be illegal in other countries.
   For products with a broad sales appeal in a range of countries, it is possible that several different transceivers will need to be selected, appropriate to each country.
b. Power consumption, in conjunction with any other considerations that determine the amount of power available.

For example, transmitter/receivers with a high power consumption may be unsuitable for battery operation.

c. Time for the transmitter/receiver to switch between receive and transmit modes.

In the communication protocol of the present invention, the time to switch between receive and transmit is important, because the protocol includes a set of fixed time slices. Depending on the overall transaction being performed, a time slice may need to be received or transmitted.

The time to switching between receive and transmit constitutes an overhead (dead time). Large switching times have the effect of wasting bandwidth.

d. Interface type.

Many types of transmitter/receiver are available. A type that provides digital data input and output gives the simplest interface with the microprocessor.

e. Data rate.

The transmitter/receiver needs to support a data rate appropriate to the overall product requirements. This data rate could be anywhere between extremely low or extremely high.

f. Physical size, and the amount of space available.

g. Cost.

h. Amount of design effort.

At the very least, the transmitter/receiver needs:

a. A Transmit data input, used by the microprocessor to place a communication state onto the wireless medium;

b. A Receive data output, used by the transceiver to indicate to the microprocessor the state of the wireless medium; and c. A control input, used by the microprocessor to select a receive or transmit mode of operation of the transmitter/receiver.

Control inputs can range between very simple, and very complex. At the simplest extreme, it is used to select between receive and transmit. Some transmitter/receivers support a low power "sleep" mode. Others allow complex setup and configuration to be made for transmitter/receiver operating behaviour.

For the protocol described, the type of control input is not critical.

Some suitable transmitter/receivers include RFM ASH series TR1000 to TR3100, Chipcon CC1000 and Nordic NRF401, NRF403.

The microprocessor 110 is used to implement the communication protocol, using the transmitter/receiver as the means of placing communication states onto the wireless medium, and receiving communication states from the wireless medium.

The type and choice of microprocessor is not very critical, provided that it can perform operations with precise timing. The degree of precision only needs to be enough to avoid creating bit errors in the communication protocol.

The protocol is best implemented in a bit-oriented manner, because this allows the point at which the time slices begin to be easily recognised.

The microprocessor is responsible for implementing at least some of the following functions:

a. A data encoding and decoding scheme used for transmission and reception—for example, Manchester coding;

b. Recovery in the receiver of the transmitted clock—for example by synchronising onto a preamble;

c. Detection of collisions;

d. Creation of each time slice, and appropriate transmission or reception during the time slice to exchange the relevant acknowledge information;

e. Implementation of an error detection scheme that can be used by a receiving device to determine if a transmission is received with or without error;

f. Implementation of an error correction scheme that can be used by a receiving device to correct for some number of received errors during a transmission; and g. Adding a repeater function that can be used to change the structure of the transaction, allowing the information packet to be repeated for the purpose of extending the range.

Figure 10:
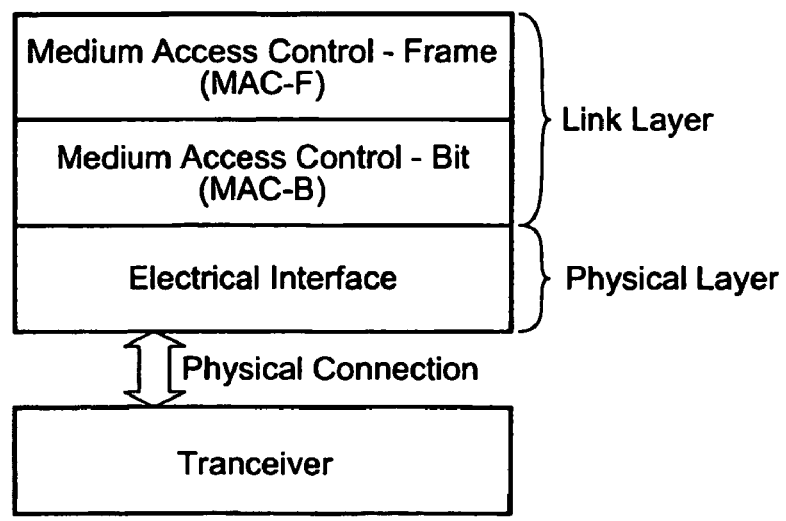
FIG. 10 shows parts of the ISO 7 layer model in which certain functions of the transceiver device of FIG. 9 are performed.

As previously described, a common method for describing the functions used in communication protocols is the ISO 7 layer model. Whilst a software structure based on this model is not mandatory, its use simplifies the overall design. Using this model, the functions performed in the bottom few layers are shown in FIG. 10.

The microprocessor hardware provides the electrical interface (Physical layer), while the microprocessor software performs the functions of all higher layers.

In particular, the software MAC-B portion of the Link Layer is responsible for all time-critical functions of data transmission and reception, including at least some of the following:

a. Starting a new transmission (including generation of any preamble);

b. Transmitting data bits;

c. Transmitting frame markers;

d. Starting reception;

e. Synchronisation onto the transmitted data stream and clock recovery;

f. Reception and decoding of data bits;

g. Reception and decoding of frame markers;

h. Notification of a collision;

i. Starting each time slice; and j. Transmission or reception of data bits inside a time slice.

The software MAC-F portion of the Link Layer is not so time critical. It is responsible for higher level message-oriented processing, including at least some of:

a. Construction of a packet from received data bits;

b. Packet error checking;

c. Determination of when to acknowledge, and the type of acknowledgement to be generated (using the time slice services of MAC-B);

d. (optionally) Based on packet structure, scheduling the operation of a repeated transmission e. Starting the transmission of a new packet;

f. Generation of packet error-check sequences;

g. Transmission of a packet, bit at a time;

h. Examination of acknowledgements, and collisions, and determination of whether a packet should be re-transmitted and when that re-transmission should occur.

Many different microprocessors are available. Some have special hardware functions available which remove some of the processor load for time critical functions, such as generation of time intervals, generation of pulses, and so on. Whilst these hardware functions are not mandatory, their use greatly simplifies the software design and coding.

Some microprocessors that are suitable for use in this invention include the Texas Instruments MSP430 family, Atmel Atmega family and the Hitachi H8/3644 family.

A useful feature of an aspect of the present invention relates to the accurate detection of the end of the variable length time slice containing the data transmitted by the transceiver/transmitter.

It is desirable for communication media to require some form of balanced transmission to avoid accumulation of a dc offset. This balance requires that the number of ON and OFF states on the medium be equal, when considered over a moderate to long time period.

There are a number of encoding schemes that can be used to translate the data bits into states on the medium. These vary in terms of the bandwidth they consume on the medium, and the ease of recovery of the transmitted data in a receiver.

The preferred coding scheme is Manchester coding, with selective use of coding violations as described earlier.

The Manchester code always has a state transition (OFF to ON, or ON to OFF) in the middle of each data bit which greatly simplifies the process in the receiver of data recovery and synchronisation onto the transmitter clock.

In the Manchester code, the state pairs (OFF, OFF and ON, ON) are not permitted.

The Manchester code can be exploited, so that the illegal state pairs are used to convey information about points of significance.

The exact choice of the illegal state sequence is not very important, so long as it is used consistently. Preferably, the dc balance of the Manchester coding should be preserved.

A suitable coding to represent the end of the variable portion of the transmission is to use a simple illegal sequence: (ON, ON, OFF, OFF). This preserves the dc balance, and can be easily recognised by the Manchester decoder.

If additional information needs to be conveyed, this sequence can be used as a "lead-in". So, for example, other possible sequences might be:
(ON, ON, OFF, OFF, ON, OFF)=first point of significance
(ON, ON, OFF, OFF, OFF, ON)=second point of significance When the methods and advantages are considered together, the preferred protocol implementation is bit-oriented, synchronous, and exploits illegal coding to denote points of significance in the variable part.

This has the advantage of providing a high level of time-based precision in finding the end of the variable portion, is relatively easy to implement, removes any reliance on characterisation of UARTs, and does not need escape sequences or bit-stuffing. Furthermore, the high time-based precision in finding the end of the variable portion also creates a high level of precision in determining the start of the fixed time slices that follow.

The fixed time slices are easily transmitted, simply by counting the transmitted states or bits. The received time slices require a Manchester decoder (without the need to support the illegal states), and a timer in the case where nothing is transmitted during the period of the received time slice.

It will be understood that the above has been described with reference to a preferred embodiment and that many variations and modifications may be made within the scope of the present invention.

The invention claimed is:

1. A method of detecting a collision between two transmissions in a radio frequency network of devices, the method including:
transmitting from a first device, a first data frame including data that is coded so as to be perceived by a device receiving the first data frame as a collision when the device is already receiving data from another source;
transmitting from a second device, a second data frame including data that is coded so as to be perceived by a device receiving the second data frame as a collision when the device is already receiving data from another source;
detecting a coded data sequence from the second data frame while receiving the first data frame;
recognizing a resulting data sequence as indicating a collision; and
transmitting a collision signal that is itself perceived by one or more other devices as a collision.

2. A method according to claim 1, further comprising, upon detecting the resulting data sequence, transmitting a collision acknowledge signal to inform the first device that its transmission was interrupted.

3. A method according to claim 2, wherein the collision acknowledge signal is transmitted after all the data frames are received.

4. A method according to claim 1, wherein the one or more other devices transmit a subsequent collision signal upon receiving the collision signal.

5. A radio communication system, comprising:
a first device that transmits a first data frame including data that is coded so as to be perceived by a device receiving the first data frame as a collision when the device is already receiving data from another source;
a second device transmits that transmits a second data frame including data that is coded so as to be perceived by a device receiving the second data frame as a collision when the device is already receiving data from another source; and
a third device that receives the first and second data frames, detects the coded data from the second data frame while receiving the first data frame, recognizes a resulting data sequence as indicating a collision, and transmits a collision signal to other devices which itself will be perceived by the other devices as a collision.

6. A system according to claim 5, wherein upon detecting the resulting sequence, the third device transmits a collision acknowledge after receiving the complete second data frame.

7. A system according to claim 5, wherein the other devices, upon receiving the collision signal, each transmit a subsequent collision signal which is perceived by other devices as a collision.

8. A transceiver for use in a radio communication system including at least two other transceivers,
wherein the transceiver:
receives, from a first transceiver of the other transceivers, a first data frame including data that is coded so as to be perceived by a device receiving the first data frame as a collision when the device is already receiving data from another source;
receives, from a second transceiver of the other transceivers, a second data frame including data that is coded so as to be perceived by a device receiving the second data frame as a collision when the device is already receiving data from another source;
and upon receiving the coded data from the second data frame while receiving the first data frame, recognizes a resulting data sequence as indicating a collision, and transmits a collision signal which will itself be perceived by the other transceivers as a collision.

9. A transceiver according to claim 8, wherein the transceiver continues to receive the first and second data frames until the transceiver detects an end of frame marker in the data frame which finishes last, at which time, the transceiver transmits a collision acknowledge.

10. A radio communication system including a transceiver/transmitter, and at least two transceiver/receivers,
wherein the transceiver/transmitter transmits data in a first time slot to the transceiver/receivers, and
wherein upon receipt of the data, each of the transceiver/receivers is configured to return a first acknowledgement state in a second time slot, after the first time slot, is configured to return a second acknowledgement state in a third time slot, after the second time slot, and is configured to return a collision acknowledgement in a fourth time slot.

11. A radio communications system according to claim 10, wherein one of the acknowledgement states is a positive acknowledge and the other acknowledgement state is a negative acknowledge.

12. A radio communications system according to claim 11, wherein the first acknowledgement state is the positive acknowledge and the second acknowledge state is the negative acknowledge.

13. A radio communications system according to claim 11, wherein upon each transceiver/receiver detecting a correctly coded transmission in the negative acknowledge time slot, each transceiver/receiver discards the data previously received in the first time slot and the transceiver/transmitter re-transmits the data to each of the transceiver/receivers.

14. A radio communications system according to claim 10, wherein the first time slot is variable in length and the second and third time slots are fixed in length.

15. A transceiver/receiver for use in a radio communications system including at least one transceiver/transmitter and at least one other transceiver/receiver,
wherein the transceiver/receivers upon receiving a data packet in a first time slot from said transceiver/transmitter, is configured to transmit a first acknowledgement state in a second time slot, after the first time slot, is configured to transmit a second acknowledgement state in a third time slot, after the second time slot, and is configured to transmit a collision acknowledgement state in a fourth time slot, after the third time slot.

16. A transceiver/receiver according to claim 15, wherein the transceiver/receiver further receives the first acknowledgement state in the second time slot from the at least one other transceiver/receiver or receives the second acknowledgement state in the third time slot from the at least one other transceiver/receiver.

17. A transceiver/receiver according to claim 16, wherein one of the acknowledgement states is a positive acknowledge and the other acknowledgement states is a negative acknowledge.

18. A transceiver/receiver according to claim 17, wherein the first acknowledgement state is the positive acknowledge and the second acknowledgement state is the negative acknowledge.

19. A transceiver/receiver according to claim 18, wherein upon receiving a negative acknowledge from the at least one other transceiver/receivers, the transceiver/receiver discards the data packet received in the first time slot.

20. A transceiver/transmitter for use in a communications system including at least one other transceiver/receiver,
wherein the transceiver/transmitter transmits a data packet in a first time slot to the at least one transceiver/receiver and is configured to receive a first acknowledge state in a second time slot, after the first time slot from one or more of the transceivers/receivers, is configured to receive a second acknowledgement state in a third time slot after the second time slot from one or more of the transceiver/receivers, and is configured to receive a collision acknowledgement state in a fourth time slot after the third time slot, from one or more of the transceiver/receivers.

21. A transceiver/transmitter according to claim 20, wherein one of the acknowledgement states is a positive acknowledge and the other acknowledgement state is a negative acknowledge.

22. A transceiver/transmitter according to claim 21, wherein upon receiving a negative acknowledge, the transceiver/transmitter retransmits the data to the at least one transceiver receivers.

23. A radio communication system including a first transceiver, a second transceiver and a repeater, the first and second transceivers being separated from each other by a distance greater than at least one of their respective maximum transmission ranges, and the repeater being located intermediate the first and second transceivers,
wherein upon receiving data from one of either the first or second transceivers, in a first time slot, the repeater is configured to transmit a repeater flag in a second time slot, and then in a third time slot is configured to transmit the data received in the first time slot, and
the first and second transceivers are configured to transmit a positive acknowledge in a first of three sub-time slots of a fourth time slot, are configured to transmit a negative acknowledge in a second of the three sub-time slots of the fourth time slot, and are configured to transmit a collision indication in a third of the three sub-time slots of the fourth time slot.

24. A radio communication system according to claim 23, wherein in a fifth time slot, the repeater transmits to all transceivers an overall status for the repeated transmission.

25. A repeater for use in a radio communication system including at least two transceivers, the at least two transceivers being separated from each other by a distance greater than at least one of the respective transmitting ranges of the transceivers, the repeater being disposed intermediate the at least two transceivers,
wherein, upon receiving data in a first time slot, the repeater is configured to transmit a repeat flag in a second time slot, and is configured to transmit in a third time slot, the data received in the first time slot,
the at least two transceivers are configured to transmit a positive acknowledge in a first of three sub-time slots of a fourth time slot, and are configured to transmit a negative acknowledge in a second of the three sub-time slot of the fourth time slot, and
the repeater is configured to transmit a collision acknowledge in a third of the three sub-time slots of the fourth time slot, if a collision has occurred between two or more transmissions.

26. A transceiver for use in a radio communication system including at least one other transceiver and a repeater, the transceiver and the at least one other transceiver being separated from each other by a distance greater than at least one of their respective transmitting ranges, the repeater being disposed intermediate the transceiver and the at least one other transceiver,
wherein, upon receiving a repeat flag from the repeater, in a second time slot, the transceiver suspends further action until the transceiver receives from the repeater, in a third time slot, data that was originally transmitted by the at least one other transceiver in a first time slot, before the second time slot.

27. A transceiver according to claim 26, wherein the transceiver transmits an acknowledgement indicating the successful or unsuccessful receipt of the data transmitted in the third time slot, or the occurrence of a collision occurring between two or more transmissions.

28. A transceiver according to claim 27, wherein the transceiver transmits a positive acknowledge in a first of three sub-time slots of the fourth time slot, or transmits a negative acknowledge in a second of three sub-time slots of the fourth time slot, or transmits a collision acknowledge in a third of three sub-time slots of the fourth time slot.

29. A transceiver according to claim 26, wherein in a fifth time slot, the repeater will transmit to all transceivers an overall status for the repeated transmission.

30. A radio communication system including at least a first transceiver, a second transceiver and a repeater, the first transceiver and the second transceiver being separated by a distance greater than a maximum transmission range of at least one of the transceivers, the repeater being disposed intermediate the first and second transceivers, such that upon receipt of a data transmission from the first transceiver, the repeater re-transmits the data transmission from the first transceiver,
wherein, upon receipt of a data transmission from the second transceiver before the repeater retransmits the data transmission from the first transceiver, the repeater transmits a data sequence instructing each transceiver to ignore the transmission in progress.

31. A radio communication system according to claim 30, wherein respective transmissions of the first and second transceivers are headed by a sequence coded such as to be perceived as a collision by a device receiving the transmissions overlapped in time.

32. A radio communication system according to claim 31, wherein the data sequence transmitted by the repeater begins with a sequence coded such as to be perceived as a collision when received by a receiving device.

33. A radio communication system according to claim 32, wherein upon receiving the data sequence from the repeater, each receiver will immediately transmit the same sequence coded so as to be perceived as a collision by a receiving device, once only, and then ignore further received information until the end of the transmission.

34. A radio communication system according to claim 33, wherein when the end of the transmission is reached, receiving devices will transmit an acknowledgement indicating that a collision was detected or will not transmit any acknowledgement at all.

35. A radio communication system according to claim 34, wherein upon a transmitting device finding either an acknowledgement indicating a collision, or finds no acknowledgement at all, the transmitting device will delay for a period before attempting to repeat its original transmission.

36. A radio communication system according to claim 35, wherein the delay period is calculated by each transceiver selecting a random number and scaling the random number according to the number of bits in its respective transmission.

37. A radio communication system according to claim 36, wherein if subsequent transmission retries still collide, subsequently-calculated delay periods are increased.

38. A radio communication system according to claim 37, wherein after a predetermined number of unsuccessful retries, the radio communication system ceases further transmission attempts.

39. A radio communication system according to claim 38, wherein after ceasing further transmission attempts, the radio communication system alerts an operator to the fact that it has ceased further transmission.

* * * * *

UNITED STATES PATENT AND TRADEMARK OFFICE
CERTIFICATE OF CORRECTION

| | | |
|---|---|---|
| PATENT NO. | : 7,656,793 B2 | Page 1 of 1 |
| APPLICATION NO. | : 10/567572 | |
| DATED | : February 2, 2010 | |
| INVENTOR(S) | : A. Quick et al. | |

It is certified that error appears in the above-identified patent and that said Letters Patent is hereby corrected as shown below:

At column 18, line 27 (claim 5, line 6), "transmits that transmits" should be --that transmits--.

At column 19, line 32 (claim 15, line 4), "transceiver/receivers" should be --transceiver/receiver,--.

Signed and Sealed this

Tenth Day of August, 2010

David J. Kappos
*Director of the United States Patent and Trademark Office*